(12) United States Patent
Huang

(10) Patent No.: US 7,669,347 B1
(45) Date of Patent: Mar. 2, 2010

(54) STRUCTURE OF A MEASURING TAPE DEVICE

(75) Inventor: Jason Huang, Taipei (TW)

(73) Assignee: Index Measuring Tape Co., Ltd., Taipei (TW)

(*) Notice: Subject to any disclaimer, the term of this patent is extended or adjusted under 35 U.S.C. 154(b) by 0 days.

(21) Appl. No.: 12/198,699

(22) Filed: Aug. 26, 2008

(51) Int. Cl.
*G01B 3/08* (2006.01)

(52) U.S. Cl. .............................. 33/758; 33/760; 33/770

(58) Field of Classification Search ........... 33/758–760, 33/768, 770, DIG. 1
See application file for complete search history.

(56) References Cited

U.S. PATENT DOCUMENTS

| | | | | |
|---|---|---|---|---|
| 1,973,843 A | * | 9/1934 | Buck | 33/770 |
| 2,663,941 A | * | 12/1953 | Dart | 33/768 |
| 4,827,622 A | * | 5/1989 | Makar | 33/770 |
| 6,070,338 A | * | 6/2000 | Garity | 33/760 |
| 6,442,863 B1 | * | 9/2002 | Poineau et al. | 33/758 |
| 6,546,644 B2 | * | 4/2003 | Poineau et al. | 33/758 |
| 6,637,126 B2 | * | 10/2003 | Balota | 33/770 |
| 6,678,967 B1 | * | 1/2004 | Jueneman | 33/758 |
| 7,240,439 B2 | * | 7/2007 | Critelli et al. | 33/758 |
| 7,487,600 B1 | * | 2/2009 | Cooper | 33/770 |

* cited by examiner

*Primary Examiner*—G. Bradley Bennett
*Assistant Examiner*—Tania C Courson
(74) *Attorney, Agent, or Firm*—Jackson IPG PLLC

(57) ABSTRACT

An improvement on the structure of a measuring tape device is that a magnetic mechanism is secured at the distal end of a measuring tape. The magnetic mechanism is not placed onto the leg piece of the hook member and thus is not formed as part of the body of the hook member of the measuring tape. The front end of the magnetic mechanism is placed in alignment with the "0" cm mark on the measuring tape. During measuring process of an object of measurement and a designated point, the magnetic mechanism allows the measuring tape to be magnetically attached to the surface of the object and anchored at the exact starting point of measurement, and therefore, the measuring precision will not be skewed because of thickness of the hook member or because of the gap caused by the movable mechanics of the hook member.

3 Claims, 10 Drawing Sheets

STRUCTURE OF A MEASURING TAPE DEVICE

BACKGROUND OF THE INVENTION

1. Field of the Invention

The present invention relates to improvement on the structure of a measuring tape device, in particular, it refers to a measuring tape device with which the precision of measurement will not be skewed by thickness of the hook member located at the distal end of a measuring tape and/or the gap caused by the movable mechanics of the hook member.

2. Description of Prior Art

It is a known fact that measuring tape device is a rather mechanical and convenient device amongst various types of measuring tools. As shown in FIG. 1A, a conventional measuring tape device 1 contains a coilable tape 12 that is spring-loaded (not shown in the drawings) within a casing 11. The measuring tape device 12 has a hook member 13 secured to the distal end of a measuring tape. The hook member 13 is composed of two parts: (1) the backing plate 14 that is secured to the distal end of the tape by rivets and (2) the perpendicularly-extended part 15 is the leg piece of the hook member. During application, the hook member 13 can be used to hang onto or grasp to an object of measurement so to allow the tape to measure the distance/length between an object of measurement and a designated point.

However, for a conventional measuring tape device, the hook member 13 can only be applied to either hook onto or push against an object of measurement; in the case that the measurement is to be applied on a flat/smooth surface, it often happens that there is no anchor point for the hook member, so that the measuring process can only be carried out with the surface of the measuring tape loosely glides along the top of and/or pushes against the surface of the object of measurement. Since there is no fastened grip at the distal end of the measuring tape for a proper measurement, the process and the outcome of the measurement is therefore inevitably affected.

In order to resolve the issue of hook member anchoring, manufacturers tried to come up with ideas that placed magnetic piece at the leg piece of the hook member. As shown in FIG. 1B per Taiwan Patent Publication No. 405703, in which it disclosed a hook member that contained a mount opening at the leg piece of the hook member, a magnetic piece of same dimension as the opening was then mounted into the opening, and was formed as part of the body of the leg piece of the hook member. In an alternative invention as shown in FIG. 1C per Taiwan Patent Publication No. M258275, the invention used a plug-in mechanism that allowed a magnetic piece to be plugged into a pre-set slot at the leg piece of the hook member and the magnetic piece was formed as part of the body of the leg piece of the hook member, so that it achieved similar effect as that of the invention per shown in FIG. 1B. Another example as shown in FIG. 1D per U.S. Pat. No. 6,874,245, in which it disclosed an L-shape magnetic riveting piece that was connected to the distal end of a measuring tape, the front portion of the magnetic riveting piece is protected with a cover, so that it in effect became the leg piece of the hook member, which was then to be used to either hook onto or magnetically attached to the object of measurement. A further example as shown in FIG. 1E per U.S. Pat. No. 7,240,439, in which the invention contained a hook member on which there was mount opening, a magnetic piece was mounted into the mount opening so that it was formed as part of the body of the leg piece of the hook member and then the hook member was protected with a cover. As a result, the hook member could either be hooked onto or magnetically attached with the object of measurement.

Based on the above patented inventions, it was obvious that the inventors' intentions were to improve anchoring stability during measuring process. By attaching a magnetic piece to the leg piece of a hook member of a measuring tape device, the inventions utilized the attractive nature between a hook member that was magnetized and an object of measurement that was metallic. As such, the anchoring stability between a measuring tape and a metallic object of measurement could be improved. However, as shown in FIG. 1F, although magnetic piece 14 was placed onto the hook member of most of the above patented inventions, the magnetic piece 14 was thicker than the leg piece of the hook member; as such, in order to align the anchored starting point on the surface of the object of measurement with the magnetic piece that was on the hook member, the hook member must be designed so that it allowed the hook member to be movable forward or backward when necessary. Yet during measuring process, when a hook member was to be pushed against or magnetically attached to the metallic surface of the object of measurement, these designs still resulted in measurement imprecision caused by thickness of the hook member and/or the gap d that was effected from the movable mechanics of the hook member. Besides, the magnetic piece mentioned in most of the above inventions was mounted onto a mount opening of a hook member of the measuring tape, as such, in the case that the measuring tape device was to be dropped or if the hook member was to be impacted with another hard object, then there would be a great chance that the magnetic piece to be fell off the hook member, and thus caused operational nuisance.

SUMMARY OF THE INVENTION

In view of the technical deficiencies arisen in the prior art, the inventor, with years of experiences in the research of related products and in the accumulation of related technical skills, has dedicated great efforts studying various approaches against the above mentioned deficiencies. After continuously researching, experimenting and making improvements, the inventor ultimately bring about the formulation and design of the present invention.

The improvement on the structure of a measuring tape device of present invention is that a magnetic mechanism is to be secured at the distal end of a measuring tape, the magnetic mechanism is placed in alignment at the "0" cm mark on the measuring tape, and therefore there will not be the issue of thickness variation of the hook member. As such, one of the objectives of present invention is that the setting of the magnetic mechanism is in such a way that it will not affect the precision of measurement when measuring the distance/length of an object of measurement and a designated point.

Another objective of the improvement on the structure of a measuring tape device of present invention is that the magnetic mechanism that is secured at the distal end of the tape allows the tape to be magnetically attached to any specific article, for example, to pick up small metallic articles at places that cannot be reached by hands, or by using the distal end of the tape to push against or hook onto places where conventional hook member cannot be applied.

According to the above objectives, the improvement on the structure of a measuring tape device of present invention is that the magnetic mechanism is secured at the distal end of the measuring tape, the magnetic mechanism is not placed onto and to be formed as part of the body of the leg piece of the hook member, the magnetic mechanism is set in alignment at the "0" cm mark on the measuring tape; the mechanism enables the distal end of the tape to be magnetically attached to any specific article, for example, to pick up small metallic articles at places that cannot be reached by hands, or by using the distal end of the tape to push against or hook onto places where conventional hook member cannot be applied. At the same time, during the measuring process of an object of measurement and a designated point, the magnetic mechanism allows the measuring tape to be magnetically attached to the surface of the object and anchored at the exact starting point of measurement, therefore, the measuring precision will not be skewed because of the thickness of the hook member or because of the gap caused by the movable mechanics of the hook member.

A more complete understanding of these and other features and advantages of the present invention will become apparent from a careful consideration of the following detailed description of certain embodiments illustrated in the accompanying drawings.

DETAILED DESCRIPTION OF THE PREFERRED EMBODIMENTS

Figure 1A:
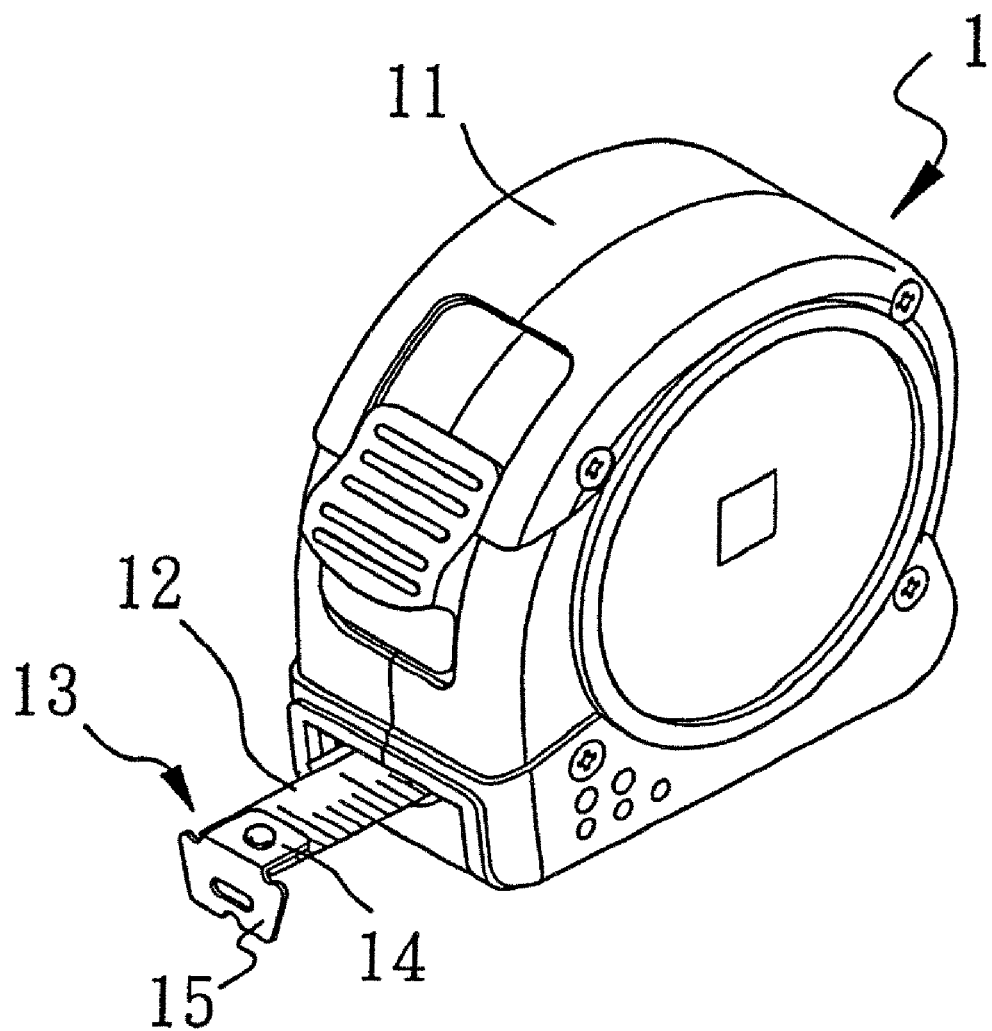
FIG. 1A is a three dimensional illustrative view of a conventional measuring tape device.
Figure 1B:
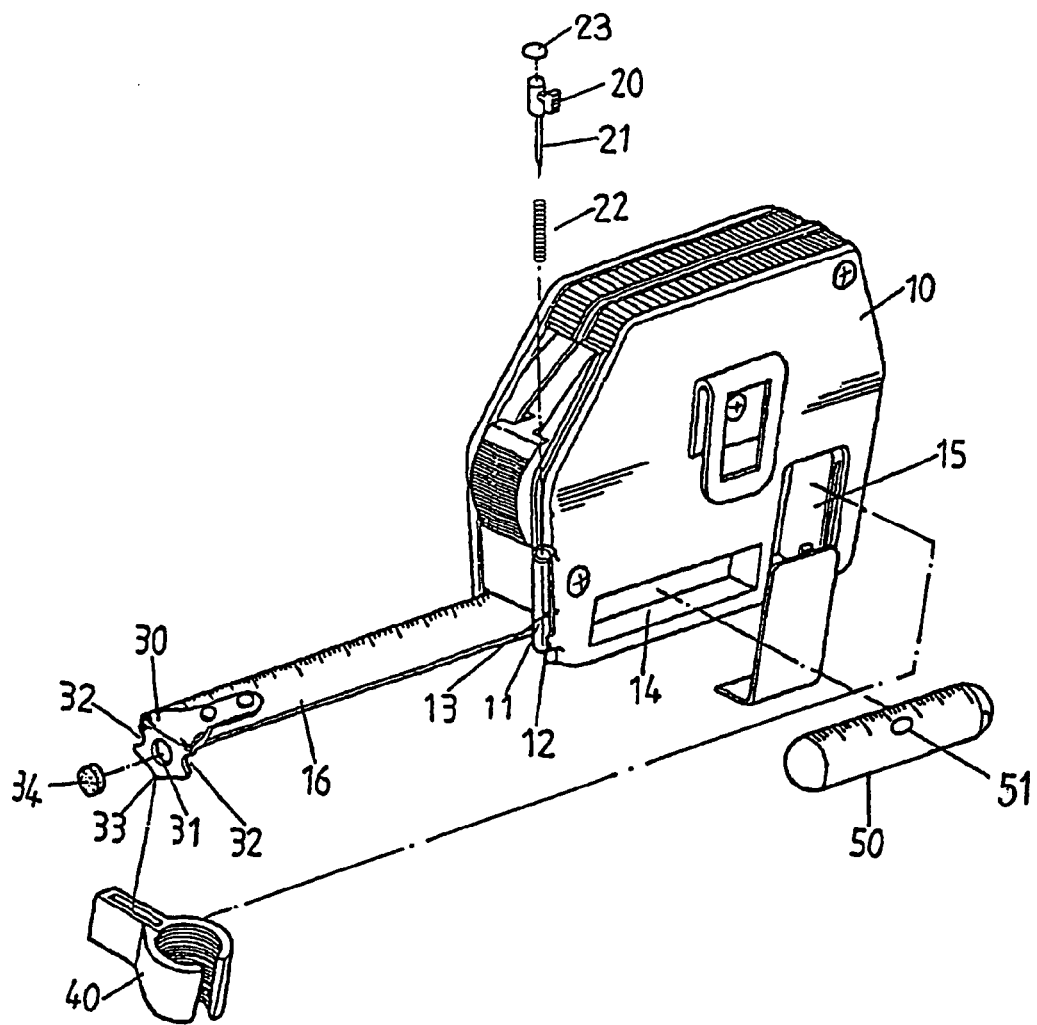
FIG. 1B is a three dimensional illustrative view showing the embodiment of Taiwan Patent Publication No. 405703.
Figure 1C:
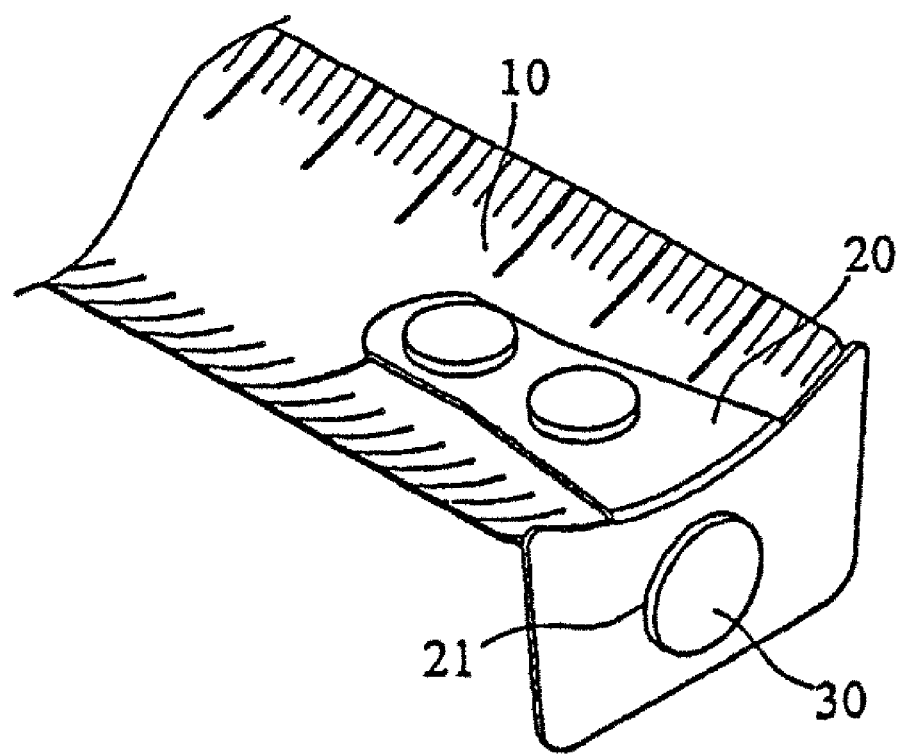
FIG. 1C is an illustrative view of a hook member and the distal end of the embodiment of Taiwan Patent Publication No. M258275.
Figure 1D:
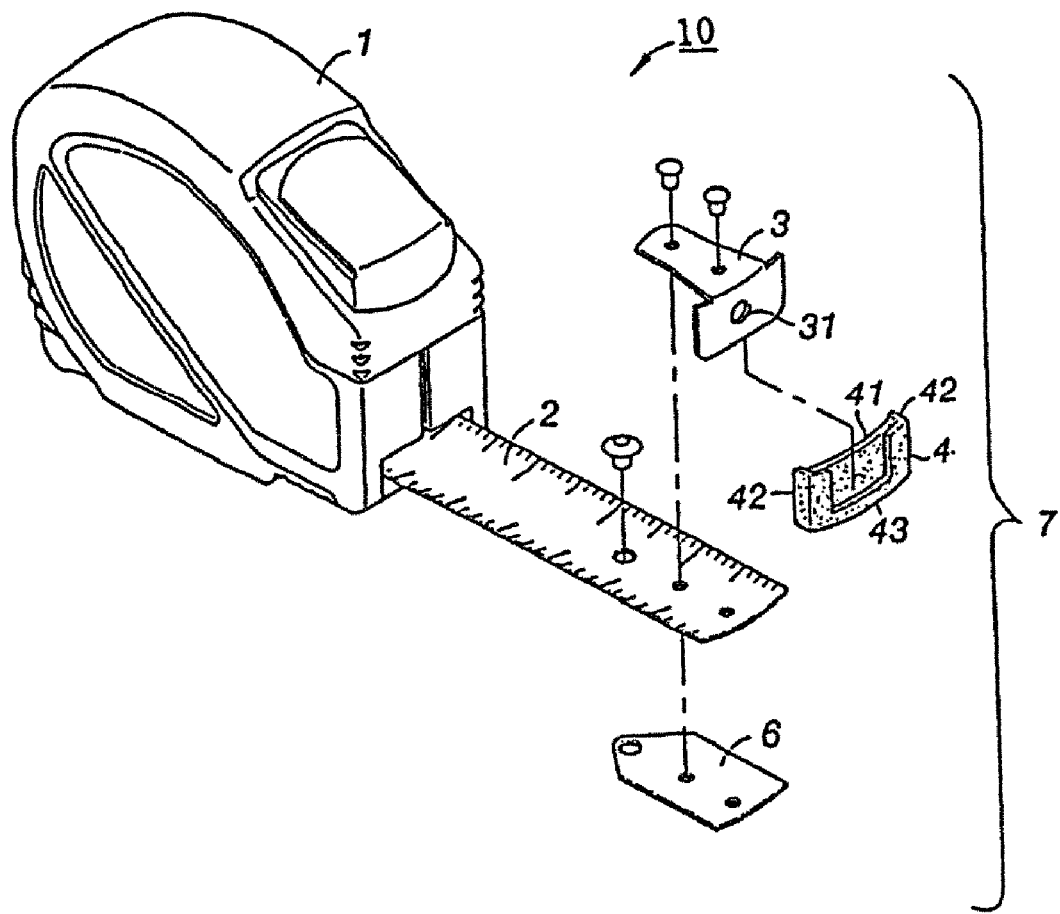
FIG. 1D is a three dimensional illustrative view showing the embodiment of U.S. Pat. No. 6,874,245.
Figure 1E:
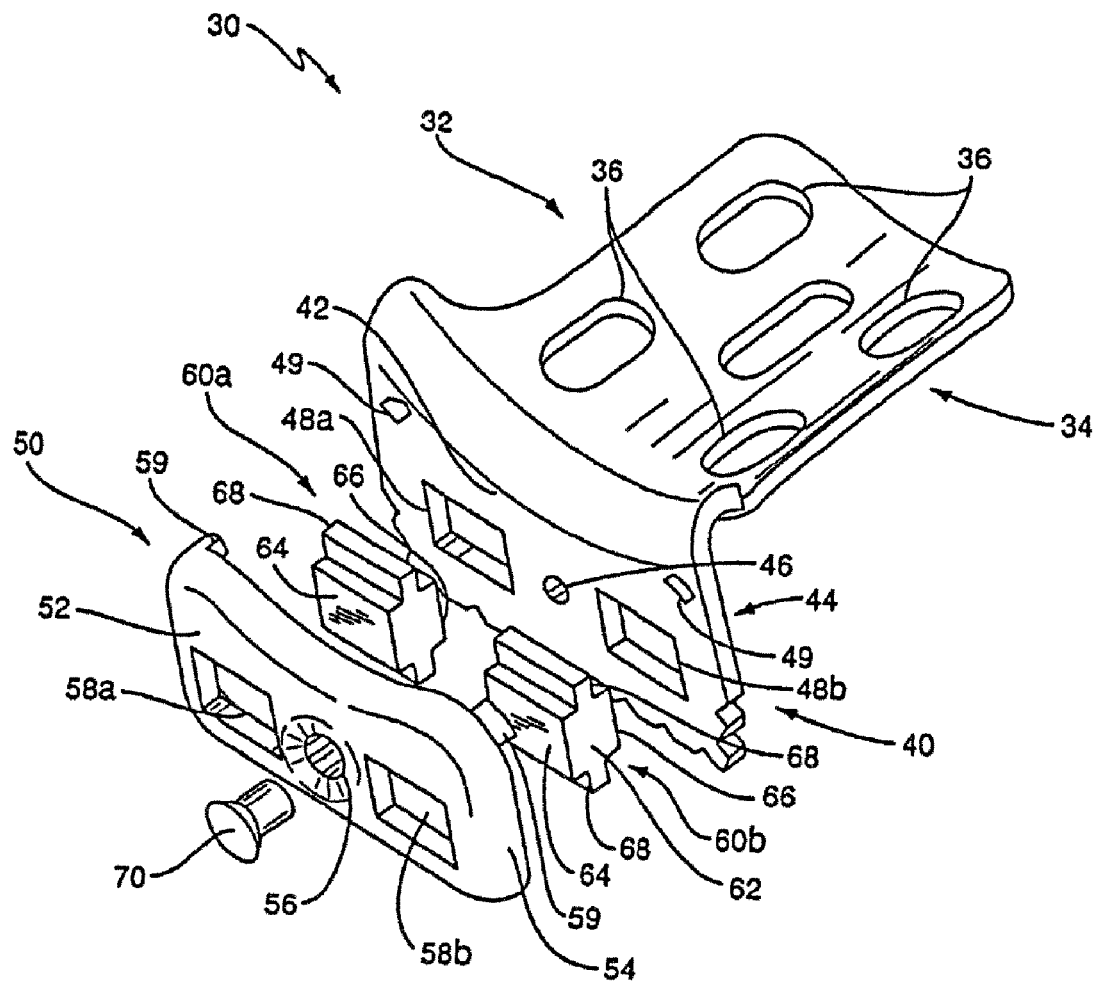
FIG. 1E is a three dimensional dissected illustrative view showing the embodiment of U.S. Pat. No. 7,240,439.
Figure 1F:
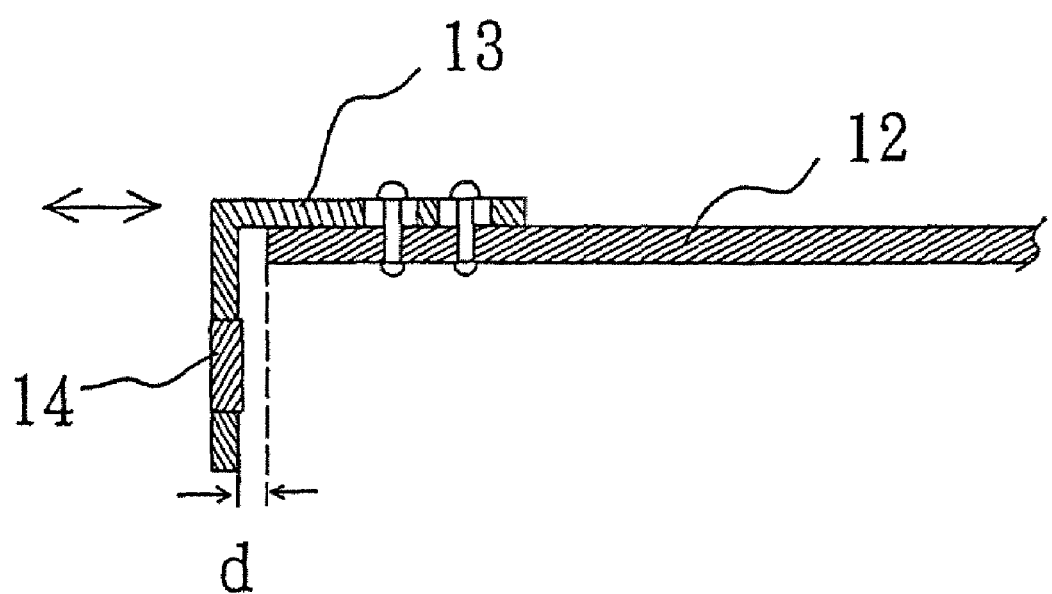
FIG. 1F is a cross sectional illustrative view of a hook member and the distal end of a conventional measuring tape.
Figure 2:
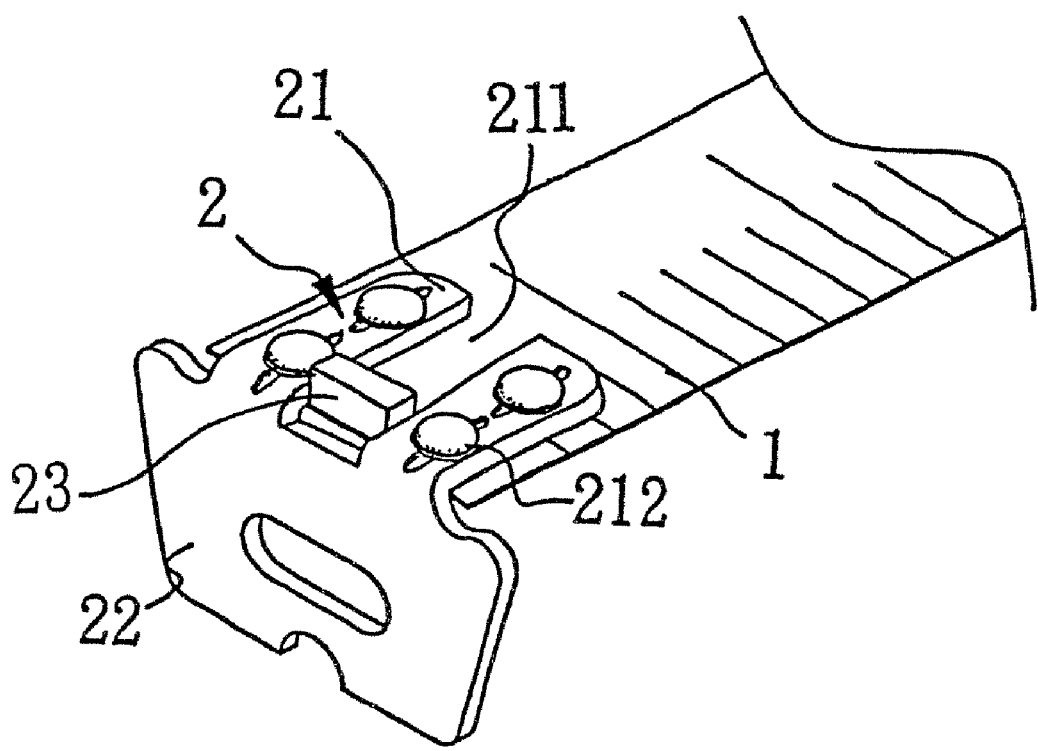
FIG. 2 is a three dimensional illustrative view of the embodiment of the distal end of a measuring tape and its hook member of present invention.
Figure 5:
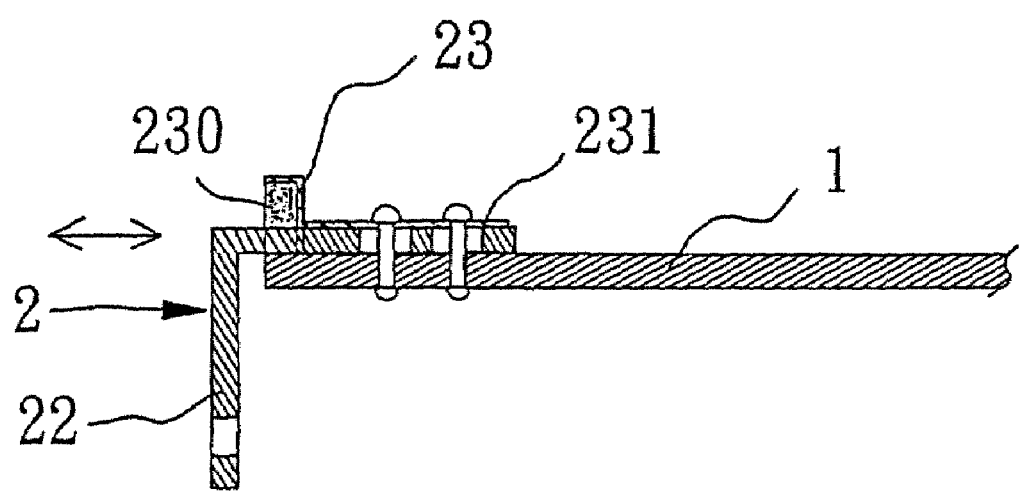
FIG. 5 is a cross sectional illustrative view of an embodiment of the distal end of a measuring tape and its hook member of present invention.

The present invention relates to improvement on the structure of a measuring tape device, as shown in FIGS. 2 and 5, the structural improvement of measuring tape device of present invention is that a magnetic mechanism 23 is secured at the distal end of a measuring tape 1. The magnetic mechanism 23 is not placed onto the leg piece of the hook member 2 and thus is not formed as part of the body of the hook member 2 of the measuring tape 1, the front of the magnetic mechanism 23 is placed in alignment with the "0" cm mark on the measuring tape 1. The mechanism enables the distal end of the tape to be magnetically attached to any specific article, for example, to pick up small metallic articles at places that cannot be reached by hands, or by using the distal end of the tape to push against or hook onto places where conventional hook member cannot be applied. At the same time, during the measuring process of an object of measurement and a designated point, the magnetic mechanism allows the measuring tape to be magnetically attached to the surface of the object and anchored at the exact starting point of measurement, therefore, the measuring precision will not be skewed because of thickness of the hook member or because of the gap caused by the movable mechanics of the hook member.

In one embodiment of present invention, as shown in FIGS. 2 and 5, the hook member 2 is composed of two parts, one part is the backing plate 21 that is secured to the distal end of the tape by rivets and the other part is the perpendicularly-extended part 22 that is the leg piece of the hook member 2. Both parts are made of metal and are formed as one continuous body. On the backing plate 21, there is an open slot 211; on the surface of the backing plate 21, there are a few elongated riveting holes 212 that are used to secure the backing plate 21 to the distal end of the measuring tape 1 by rivets. The elongated riveting holes allow the hook member 2 to be moved forward or backward when necessary. A magnetic mechanism 23 is secured inside the open slot 211 of the backing plate 21 and it is placed on the distal end of the measuring tape 1, the placement of the front of the magnetic mechanism 23 is in alignment with the "0" cm mark on the measuring tape 1. There are many ways to secure the said magnetic mechanism 23 onto the measuring tape 1 and at the same time to settle the magnetic mechanism to be in exact alignment with the "0" cm mark on the measuring tape 1.

Figure 3:
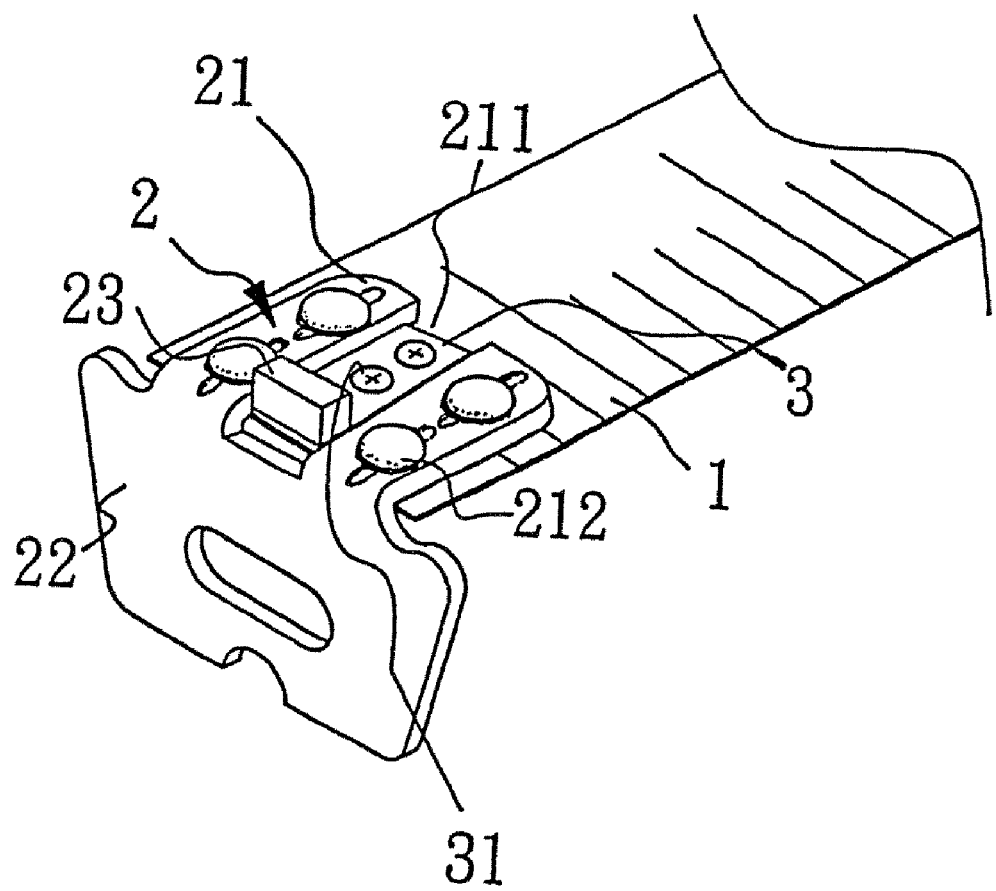
FIG. 3 is a three dimensional illustrative view of a second embodiment of the distal end of a measuring tape and its hook member of present invention.

As shown in FIG. 3, one way of securing the above magnetic mechanism 23 to the measuring tape 1 is to attach the magnetic mechanism 23 to the surface of one end of a connection plate 3 with adhesives or adhesive compounds, then the connection plate 3 is screwed with a few screws 31 that are to penetrate through the connection plate 3 and into the pre-drilled holes on the measuring tape 1. The placement of the magnetic mechanism 23 is in such a way that the front of the magnetic mechanism 23 is to be located in exact alignment with the "0" cm mark on the measuring tape 1.

Figure 4:
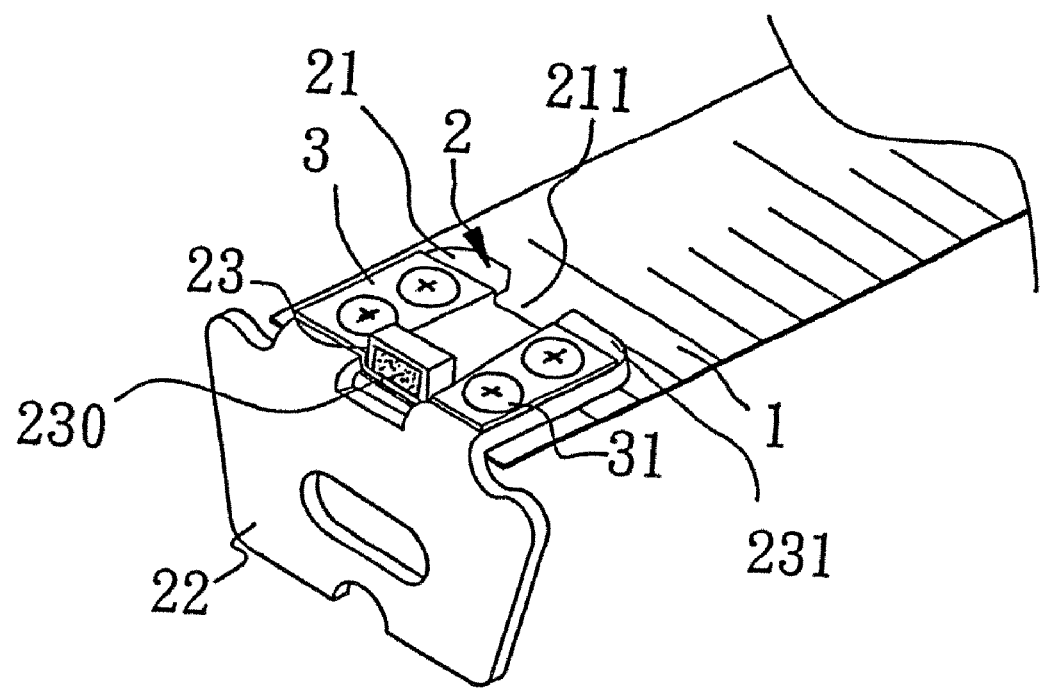
FIG. 4 is a three dimensional illustrative view of a third embodiment of the distal end of a measuring tape and its hook member of present invention.

As shown in FIG. 4, another way of securing the above magnetic mechanism 23 to the measuring tape 1 is to attach the magnetic mechanism 23 to the surface of a connection plate 3 with adhesives or adhesive compounds, then the connection plate 3 is screwed with a few screws 31 that is to penetrate through the connection plate 3, the riveting holes 212 on the backing plate 21 of the hook member 2, and then onto the measuring tape 1. The placement of the magnetic mechanism 23 is in such a way that the front of the magnetic mechanism 23 is to be located in exact alignment with the "0" cm mark on the measuring tape 1.

As shown in FIG. 5, the improvement on the structure of a measuring tape device of present invention is that the hook member 2 of the measuring tape 1 is movable, while the magnetic mechanism 23 is not. The structure of the magnetic mechanism 23 is mainly composed of a magnet 230. The magnet 230 is to be secured onto a connection plate 231 that will directly or indirectly attach the magnet 230 to the measuring tape 1. The magnetic strength of the magnet 230 should be best at a level that the distal end of the tape is able to be gripped to the metallic surface of the object of measurement, while the strength of the grip is strong enough to allow the coilable measuring tape 1 to be extracted out of the casing without causing the distal end of the tape to be detached from the metallic surface of the object of measurement.

From the above comprehensive illustrations, the improved structure of tape rule of present invention can be concluded to be one never seen from prior technologies. This idea has not been seen in any magazine and there has not been any comparable product available in the market, as such, it is undoubtedly that the present invention has its originality. In addition, the unique characteristics and the functionality of the present invention are far superior to the conventional products, and therefore it is unquestionable that the present invention is more in advance than any conventional products. Thus the present invention is made in accordance with the specific provisions regarding inventive patents per stated in the relevant Patent Law.

Although the present invention has been described with a certain degree of particularity, the present disclosure has been made by way of example and changes in details of structure may be made without departing from the spirit thereof.

What is claimed is:

1. An improvement on the structure of a measuring tape device, characterized in that:
    a magnetic mechanism that is secured at the distal end of a measuring tape, it is not structured to be part of the body of the leg piece of a hook member of the measuring tape;
    the placement of the magnetic mechanism is in exact alignment with the "0" cm mark on the measuring tape,
    wherein the hook member of the measuring tape is composed of two parts, one part is the backing plate that is secured to the distal end of the tape by rivets and the other part is the perpendicularly-extended part that is the leg piece of the hook member;
    on the backing plate, there is an open slot, on the surface of the backing plate, there are a few elongated holes that are used to secure the backing plate to the distal end of the measuring tape by fastening elements, and the elongated holes allow the hook member to be moved forward or backward when necessary;
    the magnetic mechanism is placed inside the open slot of the backing plate and it is placed on the distal end of the measuring tape;
    the placement of the front of the magnetic mechanism is in alignment with the "0" cm mark on the measuring tape,
    wherein the magnetic mechanism composes of a magnet, the magnet is first attached to a connection plate, and the connection plate is secured to the distal end of the measuring tape with fasteners that are penetrated through the connection plate and onto the pre-drilled holes on the surface of the measuring tape.

2. The improvement on the structure of a measuring tape device as claim in claim 1, wherein the structure of the magnetic mechanism is mainly composed of a magnet.

3. An improvement on the structure of a measuring tape device, characterized in that:
    a magnetic mechanism that is secured at the distal end of a measuring tape, it is not structured to be part of the body of the leg piece of a hook member of the measuring tape;
    the placement of the magnetic mechanism is in exact alignment with the "0" cm mark on the measuring tape,
    wherein the hook member of the measuring tape is composed of two parts, one part is the backing plate that is secured to the distal end of the tape by fastening elements and the other part is the perpendicularly-extended part that is the leg piece of the hook member;
    on the backing plate, there is an open slot, on the surface of the backing plate, there are a few elongated holes that are used to secure the backing plate to the distal end of the measuring tape by other fastening elements, and the elongated holes allow the hook member to be moved forward or backward when necessary;
    the magnetic mechanism is placed inside the open slot of the backing plate and it is placed on the distal end of the measuring tape;
    the placement of the front of the magnetic mechanism is in alignment with the "0" cm mark on the measuring tape,
    wherein the magnetic mechanism composes of a magnet, the magnet is first attached to a connection plate, then the connection plate is riveted or screwed into the elongated holes on the backing plate and then onto the measuring tape.

* * * * *